(12) United States Patent
Jang et al.

(10) Patent No.: US 11,705,071 B2
(45) Date of Patent: Jul. 18, 2023

(54) DISPLAY DEVICE WITH COMPENSATED VOLTAGE SUPPLIED TO SCAN DRIVER

(71) Applicant: Samsung Display Co., LTD., Yongin-si (KR)

(72) Inventors: Jin Won Jang, Yongin-si (KR); Seung Won Kuk, Yongin-si (KR); Myung Chul Kim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/740,633

(22) Filed: May 10, 2022

(65) Prior Publication Data

US 2023/0005429 A1 Jan. 5, 2023

(30) Foreign Application Priority Data

Jul. 1, 2021 (KR) .......................... 10-2021-0086690

(51) Int. Cl.
*G09G 3/3266* (2016.01)
(52) U.S. Cl.
CPC ... *G09G 3/3266* (2013.01); *G09G 2300/0408* (2013.01); *G09G 2300/0842* (2013.01)
(58) Field of Classification Search
CPC .................................................. G09G 3/3266
See application file for complete search history.

(56) References Cited

U.S. PATENT DOCUMENTS

2003/0058375 A1 3/2003 Moon et al.
2016/0226389 A1* 8/2016 Quaglino ................ G05F 1/468
2016/0240144 A1* 8/2016 Song ..................... G09G 3/3266
2016/0334658 A1 11/2016 Jo et al.
2017/0069268 A1* 3/2017 Tokunaga ............ G09G 3/3266
2017/0098409 A1* 4/2017 Heo ..................... G09G 3/3696
2019/0317350 A1* 10/2019 Horibe .................. G09G 3/3685

FOREIGN PATENT DOCUMENTS

| KR | 10-2018-0061120 | 7/2008 |
| KR | 10-0852813 | 8/2008 |
| KR | 10-2013-0091905 | 8/2013 |
| KR | 10-2018-0002389 | 1/2018 |
| KR | 10-2018-0002390 | 1/2018 |

OTHER PUBLICATIONS

International Search Report, with English translation, corresponding to International Application No. PCT/KR2022/009417 dated Sep. 30, 2022.

* cited by examiner

*Primary Examiner* — Sepehr Azari
(74) *Attorney, Agent, or Firm* — Kile Park Reed & Houtteman PLLC (57) ABSTRACT

A display device includes pixels electrically connected to a plurality of scan lines and a plurality of data lines, respectively, a scan driver that provides a scan signal to each of the plurality of scan lines, a voltage supply that supplies a first gate voltage to the scan driver through a first gate power line, and a voltage compensator. The voltage compensator senses a partial voltage of the first gate voltage applied to the scan driver through a feedback line. The voltage compensator compensates the first gate voltage with a second gate voltage in case that the sensed first gate voltage is greater than a first reference voltage.

18 Claims, 10 Drawing Sheets

DISPLAY DEVICE WITH COMPENSATED VOLTAGE SUPPLIED TO SCAN DRIVER

CROSS-REFERENCE TO RELATED APPLICATION(S)

This application claims priority to and the benefit of Korean Patent Application No. 10-2021-0086690 under 35 U.S.C. § 119, filed on Jul. 1, 2021, in the Korean Intellectual Property Office (KIPO), the entire contents of which are incorporated herein by reference.

BACKGROUND

1. Technical Field

The disclosure relates to a display device.

2. Description of the Related Art

As interest in an information display is increasing and a demand for using a portable information media is increasing, a demand and commercialization for a display device are being focused.

SUMMARY

An object of the disclosure is to provide a display device in which image quality is not deteriorated.

A display device according to an embodiment of the disclosure may include pixels electrically connected to a plurality of scan lines and a plurality of data lines, respectively, a scan driver that provides a scan signal to each of the plurality of scan lines, a voltage supply that supplies a first gate voltage to the scan driver through a first gate power line, and a voltage compensator. The voltage compensator may sense a partial voltage of the first gate voltage applied to the scan driver through a feedback line. The voltage compensator may compensate the first gate voltage with a second gate voltage in case that the sensed first gate voltage is greater than a first reference voltage.

Each of the plurality of scan lines may extend in parallel in a first direction, each of the plurality of data lines may extend in parallel in a second direction perpendicular to the first direction, and the voltage compensator may sense the partial voltage of the first gate voltage applied to the scan driver disposed at an upper side in the second direction.

The scan driver may include a plurality of gate integrated circuits disposed to be spaced apart from each other in the second direction, and the voltage compensator may sense the first gate voltage applied to one of the plurality of gate integrated circuits disposed at an upper side in the second direction.

The voltage supply may provide a high-level voltage or a first low-level voltage to the first gate power line.

The voltage compensator may sense the first low-level voltage applied to the one gate integrated circuit. The voltage compensator may compensate the first low-level voltage with a second low-level voltage in case that the sensed first low-level voltage is greater than the first reference voltage.

The voltage compensator may change the second low-level voltage to be lower than the first low-level voltage.

The voltage compensator may provide the second low-level voltage to the one of the plurality of gate integrated circuits.

The voltage compensator may transmit the second gate voltage to the scan driver through a second gate power line electrically connected to the scan driver.

The scan driver may provide a scan signal generated based on the second gate voltage to at least one scan line.

The voltage compensator may generate the second gate voltage. The voltage compensator may change the first reference voltage to a second reference voltage.

A display device according to an embodiment of the disclosure may include a display panel, a scan driver including at least one gate integrated circuit electrically connected to the display panel, a voltage supply that outputs a first gate voltage to each of the at least one gate integrated circuit, and a voltage compensator that senses the first gate voltage applied to one of the at least one gate integrated circuit and compensate the first gate voltage with a second gate voltage.

The voltage compensator may be electrically connected to a first voltage node and a second voltage node disposed at both sides with one of the at least one gate integrated circuit which is disposed at an upper portion of the display panel.

The voltage compensator may include a first diode electrically connected between the second voltage node and a sensing node, a comparator including a positive terminal electrically connected to the sensing node, a negative terminal electrically connected to a reference node, and an output terminal electrically connected to an output node, a first sensing voltage source electrically connected between ground power and the sensing node with at least one resistor interposed therebetween, and a second sensing voltage source electrically connected between the ground power and the reference node with at least one resistor interposed therebetween.

The voltage compensator may further include a second diode electrically connected to the first voltage node, and a first strengthening transistor including a gate electrode electrically connected to the output node, a first terminal electrically connected to a compensation voltage source, and a second terminal electrically connected to a cathode of the second diode.

The voltage compensator may further include a third diode electrically connected between the output terminal of the comparator and the output node, and a second strengthening transistor including a gate electrode electrically connected to the output node, a first terminal electrically connected to the reference node, and a second terminal electrically connected to the ground power through at least one resistor.

A display device according to an embodiment of the disclosure may include a display panel, a scan driver including a plurality of gate integrated circuits electrically connected to the display panel, a voltage supply that outputs a first gate voltage to each of the plurality of gate integrated circuits, and a voltage compensator. The voltage compensator may sense a partial voltage of the first gate voltage applied to at least one of the plurality of gate integrated circuits. The voltage compensator may compare the sensed first gate voltage with a first reference voltage. The voltage compensator may compensate the sensed first gate voltage with a second gate voltage in case that the sensed first gate voltage is greater than the first reference voltage.

The voltage compensator may change the first reference voltage to a second reference voltage after compensating the second gate voltage.

The first gate voltage may be a first low-level voltage, and the second gate voltage may be a second low-level voltage.

The voltage compensator may change the second low-level voltage to be lower than the first low-level voltage.

The plurality of gate integrated circuits may be disposed in parallel in a second direction, and the voltage compensator may sense the first gate voltage applied to one of the plurality of gate integrated circuits disposed at an upper side in the second direction.

According to an embodiment, since a gate voltage supplied to a scan driver may be compensated by adding a voltage compensator connected to the scan driver, image quality of the display device may not be deteriorated.

An effect according to an embodiment of the disclosure is not limited to the contents illustrated above, and more various effects are included in the specification.

BRIEF DESCRIPTION OF THE DRAWINGS

The above and other features of the disclosure will become more apparent by describing in further detail embodiments thereof with reference to the accompanying drawings, in which.

DETAILED DESCRIPTION OF THE EMBODIMENT

The disclosure may be modified in various manners and have various forms. Therefore, specific embodiments will be illustrated in the drawings and will be described in detail in the specification. However, it should be understood that the disclosure is not intended to be limited to the disclosed specific forms, and the disclosure includes all modifications, equivalents, and substitutions within the spirit and technical scope of the disclosure.

Terms of "first", "second", and the like may be used to describe various components, but the components should not be limited by the terms. The terms are used only for the purpose of distinguishing one component from another component. For example, without departing from the scope of the disclosure, a first component may be referred to as a second component, and similarly, a second component may also be referred to as a first component. The singular expressions include plural expressions unless the context clearly indicates otherwise.

It should be understood that in the application, a term of "include", "have", or the like is used to specify that there is a feature, a number, a step, an operation, a component, a part, or a combination thereof described in the specification, but does not exclude a possibility of the presence or addition of one or more other features, numbers, steps, operations, components, parts, or combinations thereof in advance.

It will be understood that the terms "contact," "connected to," and "coupled to" may include a physical and/or electrical contact, connection, or coupling, and vice versa.

The terms "about" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

The phrase "at least one of" is intended to include the meaning of "at least one selected from the group of" for the purpose of its meaning and interpretation. For example, "at least one of A and B" may be understood to mean "A, B, or A and B."

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

Hereinafter, a display device according to an embodiment of the disclosure is described with reference to drawings related to embodiments of the disclosure.

Figure 1:
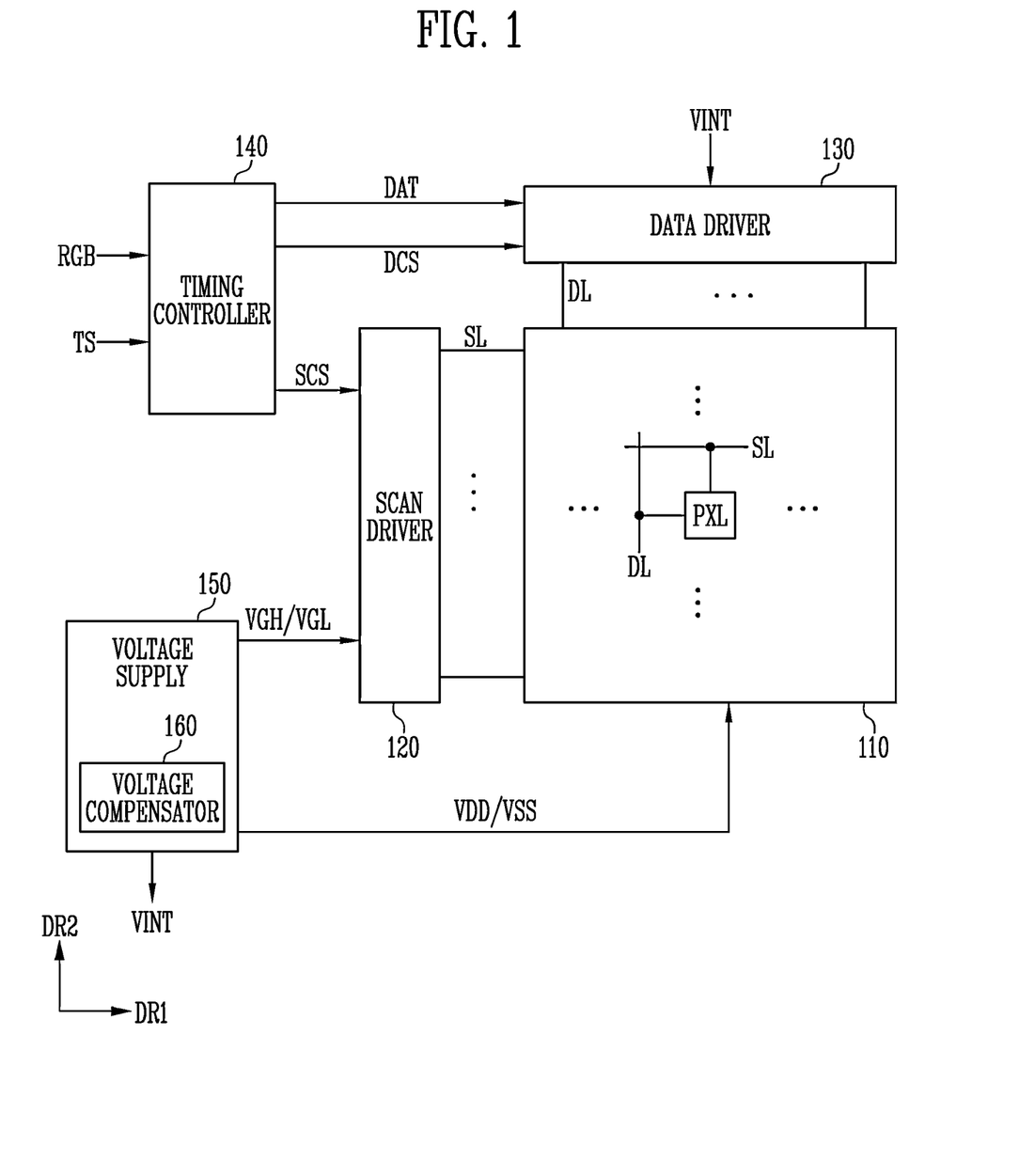
FIG. 1 is a schematic block diagram of a display device according to an embodiment.
Figure 2:
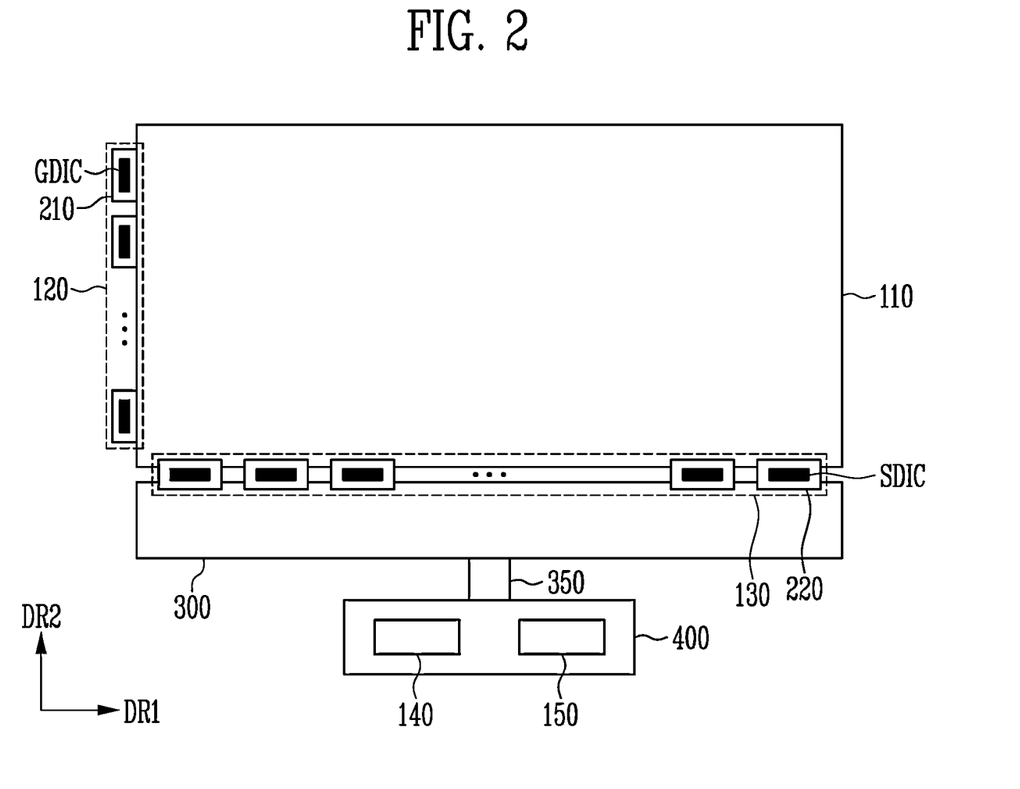
FIGS. 2 and 3 are schematic plan views of a display device according to an embodiment.
Figure 3:
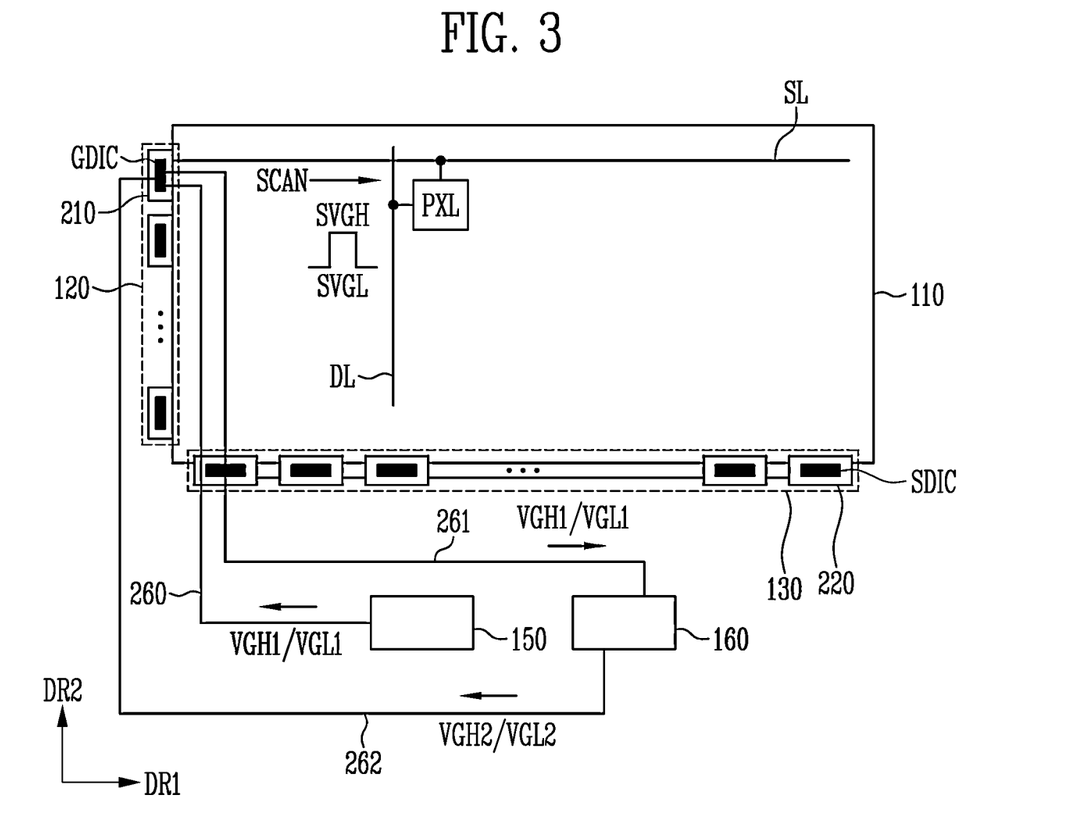

FIG. 1 is a schematic block diagram of a display device according to an embodiment, and FIGS. 2 and 3 are schematic plan views of a display device according to an embodiment.

Referring to FIG. 1, the display device may include a display panel 110, a scan driver 120, a data driver 130, a timing controller 140, a voltage supply 150, and a voltage compensator 160.

The display device may be a flat display device, a flexible display device, a curved display device, a foldable display device, a bendable display device, or a stretchable display device. In addition, the display device may be a transparent display device, a head-mounted display device, or a wearable display device. The display device may be applied to various electronic devices such as a smartphone, a tablet PC, a smart pad, a TV, and a monitor.

The display device may be implemented as a self-emission display device including self-emission elements. For example, the display device may be an organic light emitting display device including organic light emitting elements, a display device including inorganic light emitting elements, or a display device including light emitting elements configured or formed of an inorganic material and an organic material in combination.

The display panel 110 may include a pixel PXL electrically connected to a scan line SL and a data line DL. The display panel 110 may include pixels PXL respectively electrically connected to the scan lines SL and the data lines DL. The scan lines SL may extend in parallel in a first direction DR1, and the data lines DL may extend in parallel in a second direction DR2 perpendicular to the first direction DR1.

The display panel 110 may receive a first driving voltage VDD, a second driving voltage VSS, and an initialization voltage VINT from the voltage supply 150 to be described below. A detailed configuration of the pixel PXL is described with reference to FIG. 9 below.

FIG. 1 illustrates that only the scan line SL and the data line DL are electrically connected to the pixel PXL, but the disclosure is not limited thereto. According to an embodiment, the display panel 110 may further include one or more sensing control lines, sensing lines, light emission control lines, and the like corresponding to a circuit structure of the pixel PXL.

The scan driver 120 may receive a scan control signal SCS from the timing controller 140 and generate a scan signal and a sensing control signal based on the scan control signal SCS.

The scan driver 120 may provide the scan signal to a scan line SL. For example, the scan signal may be set to a gate-on voltage at which a transistor included in the pixel PXL may be turned on, and the scan signal may be used for applying a data signal (or a data voltage) to the pixel PXL.

The scan driver 120 may provide the sensing control signal to a scan control line. The sensing control signal may be set to a gate-on voltage at which the transistor included in the pixel PXL may be turned on, and the sensing control signal may be used for sensing (or extracting) a driving current flowing through the pixel PXL or applying the initialization voltage VINT to the pixel PXL.

FIG. 1 illustrates that the scan driver 120 is spaced apart from the display panel 110, but the disclosure is not limited thereto. According to an embodiment, the scan driver 120 may be mounted on the display panel 110.

FIG. 1 illustrates a scan driver 120, but the disclosure is not limited thereto. According to an embodiment, the scan driver 120 may include a first scan driver that supplies the scan signal to the display panel 110 and a first sensing driver that supplies the sensing control signal to the display panel 110. For example, the first scan driver and the first sensing driver may be implemented as separate configurations or components and positioned on both sides of the display panel 110.

The data driver 130 may receive a data control signal DCS from the timing controller 140, convert digital image data (or image data) DAT to an analog data signal (or the data voltage) based on the data control signal DCS, and provide the data voltage (or the data signal) to a data line DL. For example, the data driver 130 may supply the data signal (or the data voltage) to the data line DL during an active period of a frame. The data signal may be a data voltage for displaying an effective image and may be a value corresponding to the digital image data DAT.

The data driver 130 may supply the initialization voltage VINT supplied from the voltage supply 150 to a sensing line under control of the timing controller 140. The data driver 130 may separately supply the initialization voltage VINT for display and sensing, under the control of the timing controller 140. For example, in the active period of a frame, the data driver 130 may supply the initialization voltage VINT different from the second driving voltage VSS to the sensing line.

The data driver 130 may receive at least one sensing current from at least one pixel PXL through the sensing line. The sensing current may include information of a threshold voltage, mobility, and/or the like of a driving transistor (or a first transistor) included in the sensed pixel PXL.

The data driver 130 may calculate a characteristic of the driving transistor based on the sensing current and provide sensing data corresponding to the calculated characteristic to the timing controller 140. The timing controller 140 to be described below may compensate the digital image data DAT and/or the data signal based on the sensing data.

FIG. 1 illustrates that a data driver 130 supplies the data signal and receives the sensing current, but the disclosure is not limited thereto. According to an embodiment, a separate sensing unit (or sensing part) (not shown) may be present in the display device, and the sensing line may be electrically connected to the sensing part. The sensing part may receive the sensing current, calculate the sensing data, and provide the sensing data to the timing controller 140.

The timing controller 140 may receive an image signal RGB and timing control signals TS from an external source (for example, a graphic processor). The timing control signals TS may include a dot clock, a data enable signal, a vertical synchronization signal, a horizontal synchronization signal, and the like.

The timing controller 140 may generate the scan control signal SCS for controlling a driving timing of the scan driver 120 and provide the scan control signal SCS to the scan driver 120 and may generate the data control signal DCS for controlling a driving timing of the data driver 130 and provide the data control signal DCS to the data driver 130, using the timing control signals TS supplied from the outside, timing setting information stored therein, and the like. The timing controller 140 may generate the digital image data DAT by correcting or compensating for the image signal RGB based on the sensing data. Accordingly, the data driver 130 may provide a compensated data signal to the pixels PXL in an image display period.

The voltage supply 150 may generate and output the first driving voltage VDD, the second driving voltage VSS, the initialization voltage VINT, and gate voltages VGH and VGL. Here, the gate voltages VGH and VGL may refer to any one of a first gate voltage and a second gate voltage to be described below.

The voltage supply 150 may supply the first driving voltage VDD and the second driving voltage VSS to the pixel PXL through power lines electrically connected to the display panel 110. The voltage supply 150 may supply the initialization voltage VINT to the pixel PXL through power lines electrically connected to the data driver 130 and/or the display panel 110.

Referring to FIGS. 2 and 3, the voltage supply 150 may supply gate voltages VGH1 and VGL1 (or the first gate voltage) to the scan driver 120. The voltage supply 150 may include a voltage compensator 160. The voltage compensator 160 may sense the first gate voltages VGH1 and VGL1 in case that the first gate voltages VGH1 and VGL1 output from the voltage supply 150 are applied to the scan driver 120, and compensate the first gate voltages VGH1 and VGL1 to (or with) second gate voltages VGH2 and VGL2 according to a sensing result.

In an embodiment, the voltage compensator 160 is shown as being included in the voltage supply 150, but the disclosure is not limited thereto. According to an embodiment, the voltage compensator 160 may be implemented as an integrated circuit separate from the voltage supply 150, and the independent voltage compensator 160 may be positioned at a side of the scan driver 120. For example, the voltage compensator 160 may be mounted together on a circuit film on which the gate integrated circuit of the scan driver 120 is mounted.

In an embodiment, the voltage supply 150 and/or the voltage compensator 160 may be implemented as a power management integrated circuit (PMIC), but the disclosure is not limited thereto.

Referring to FIGS. 1 to 3, the scan driver 120 may include at least one gate integrated circuit GDIC, and a gate integrated circuit GDIC may be mounted on a first circuit film 210. The first circuit film 210 may electrically connect the gate integrated circuit GDIC and the display panel 110.

The gate integrated circuit GDIC may generate a scan signal SCAN having a high-level scan voltage SVGH or a low-level scan voltage SVGL based on the first gate voltages VGH1 and VGL1 supplied from the voltage supply 150 through a first gate power line 260, and supply the scan signal SCAN to the scan line SL.

The gate integrated circuit GDIC may generate the scan signal SCAN having the high-level scan voltage SVGH or the low-level scan voltage SVGL based on the second gate voltages VGH2 and VGL2 supplied from the voltage compensator 160 through a second gate power line 262, and supply the scan signal SCAN to the scan line SL. The second gate voltages VGH2 and VGL2 may be provided to the gate integrated circuit GDIC in case that the first gate voltages VGH1 and VGL1 sensed through a feedback line 261 are greater than a first reference voltage.

The first gate voltages VGH1 and VGL1 supplied from the voltage supply 150 may include a first high-level voltage VGH1 and a first low-level voltage VGL1.

The second gate voltages VGH2 and VGL2 supplied from the voltage compensator 160 may include a second high-level voltage VGH2 and a second low-level voltage VGL2.

In order to generate the scan signal SCAN, the first gate voltages VGH1 and VGL1 applied to the gate integrated circuit GDIC may be voltages obtained by a voltage drop or a voltage rise of the first gate voltages VGH1 and VGL1 output from the voltage supply 150. Accordingly, a voltage output from the gate integrated circuit GDIC through the scan line SL may be a voltage of a level different from that of an initial gate voltage (or the first gate voltage) VGH1 and VGL1.

At this time, the voltage drop may occur in the first gate voltages VGH1 and VGL1 applied to the gate integrated circuit GDIC positioned at an upper side in the second direction DR2. The first gate power line 260 electrically connecting the gate integrated circuit GDIC and the voltage supply 150 may have a longer or greater length as the first gate power line 260 is positioned at the upper side in the second direction DR2. This is because a resistance may be increased by the first gate power line 260. In case the voltage drop of the first gate voltages VGH1 and VGL1 occurs, a waveform distortion of the scan signal SCAN may occur. As the waveform of the scan signal SCAN is distorted, a scan voltage is not properly applied to the pixel PXL, and thus a gate block in which an image is not displayed at an upper end portion of the display panel 110 may occur. Therefore, image quality of the display device may be affected.

The voltage compensator 160 may sense a partial voltage of the first gate voltages VGH1 And VGL1 applied to the scan driver 120, and in case that the sensed voltage is greater than a first reference voltage, the voltage compensator 160 may compensate the first gate voltages VGH1 and VGL1 with the second gate voltages VGH2 and VGL2. Here, the partial voltage of the first gate voltages VGH1 and VGL1 refers to the first gate voltages VGH1 and VGL1 applied to an upper portion of the scan driver 120 based on the second direction DR2. For example, in case that the scan driver 120 includes gate integrated circuits GDIC, the voltage compensator 160 may sense the first gate voltages VGH1 and VGL1 applied to the gate integrated circuit GDIC positioned at the upper side based on the second direction DR2.

Therefore, in an embodiment, the voltage compensator 160 may be further added to compensate the gate voltages VGH and VGL supplied to the gate integrated circuit GDIC so that the image quality of the display device is not deteriorated. For example, in case that the first low-level voltage VGL1 of about −2V or greater is applied, the gate block may occur in the display panel 110. Therefore, in an embodiment, the gate voltage may be compensated so that the first low-level voltage VGL1 becomes about −2V or less.

The data driver 130 may include at least one data integrated circuit SDIC, and a data integrated circuit SDIC may be mounted on a second circuit film 220. The second circuit film 220 may electrically connect the data integrated circuit SDIC and the display panel 110.

The timing controller 140 and the voltage supply 150 may be mounted on a control board 400. A printed circuit board 300 and the control board 400 may be electrically connected through a cable 350 to enable signal transmission between the timing controller 140, the voltage supply 150, and the data driver 130.

The cable 350 may electrically connect the control board 400 and at least one printed circuit board 300 through connectors. Here, the cable 350 encompasses a device having a wiring capable of electrically connecting the control board 400 and the printed circuit board 300. For example, the cable 350 may be implemented as a flexible circuit board.

FIGS. 2 and 3 illustrate that the timing controller 140 and the voltage supply 150 are mounted on a control board 400, but the disclosure is not limited thereto. According to an embodiment, the timing controller 140 and the voltage supply 150 may be mounted on separate control boards, respectively, and each control board may be respectively connected to the printed circuit board 300.

The voltage compensator 160 may be mounted on the first circuit film 210 on which the gate integrated circuit GDIC is mounted, and thus the gate integrated circuit GDIC and the voltage supply 150 may be electrically connected.

Figure 4:
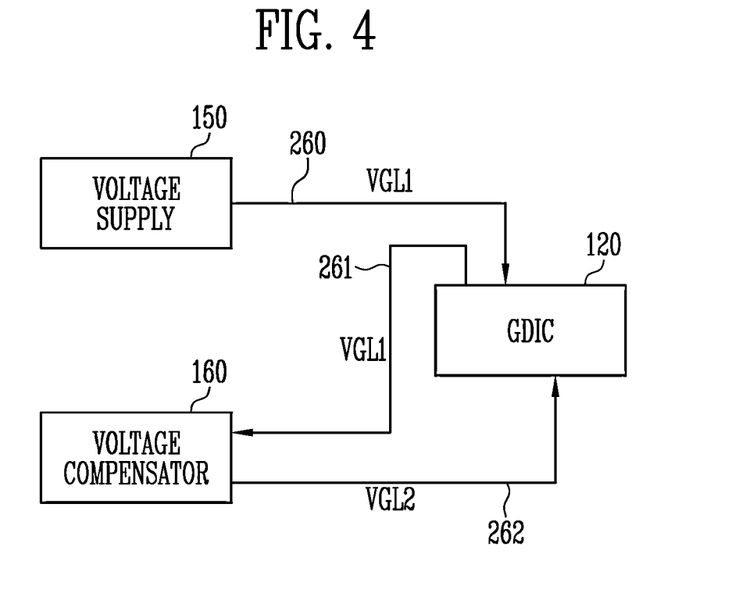
FIG. 4 is a schematic block diagram illustrating operations of a voltage supply, a voltage compensator, and a scan driver according to an embodiment.

FIG. 4 is a schematic block diagram illustrating operations of a voltage supply, a voltage compensator, and a scan driver according to an embodiment. Hereinafter, the disclosure is described with reference to FIGS. 1 to 3 together.

Referring to FIGS. 1 to 4, the voltage compensator 160 may be implemented as a configuration or component separate from the voltage supply 150. However, the disclosure is not limited thereto, and the voltage compensator 160 may be included in the voltage supply 150 or the scan driver 120 according to an embodiment.

The voltage compensator 160 may sense the partial voltage of the first gate voltage (or the first low-level voltage VGL1) applied to the scan driver 120, and in case that the sensed voltage is greater than the first reference voltage, the voltage compensator 160 may generate the second gate voltage (or the second low-level voltage VGL2) by compensating the first gate voltage (or the first low-level voltage VGL1). Here, the partial voltage of the first gate voltage (or the first low-level voltage VGL1) refers to the first gate voltage (or the first low-level voltage VGL1) applied to the upper portion of the scan driver 120 based on the second direction DR2. For example, in case that the scan driver 120 includes the gate integrated circuits GDIC, the voltage compensator 160 may sense the first gate voltage (or the first low-level voltage VGL1) applied to the gate integrated circuit GDIC positioned at the upper side based on the second direction DR2.

The voltage compensator 160 may transmit the second gate voltage (or the second low-level voltage VGL2) to the scan driver 120 through the second gate power line 262. Accordingly, the scan driver 120 may generate the scan signal SCAN based on the second gate voltage (or the second low-level voltage VGL2).

After the second gate voltage (or the second low-level voltage VGL2) is supplied to the scan driver 120 through the second gate power line 262, the voltage compensator 160 may sense a partial voltage of the gate voltage applied to the scan driver 120, and in case that the sensed voltage is greater than a first reference voltage, the voltage compensator 160 may generate a second gate voltage for compensating for the sensed voltage.

Hereinafter, a configuration of the voltage compensator is described in detail with reference to FIGS. 5 and 6.

Figure 5:
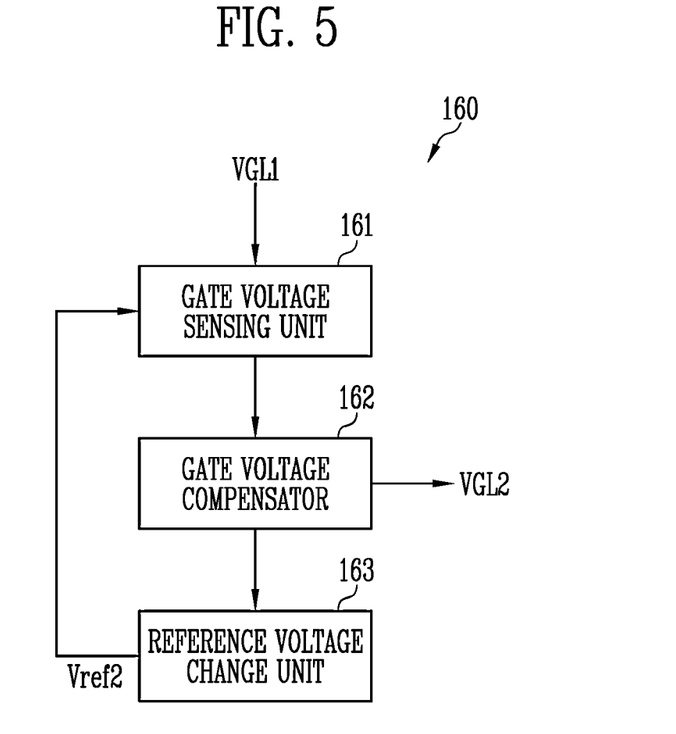
FIG. 5 is a schematic block diagram illustrating a configuration of a voltage compensator according to an embodiment.
Figure 6:
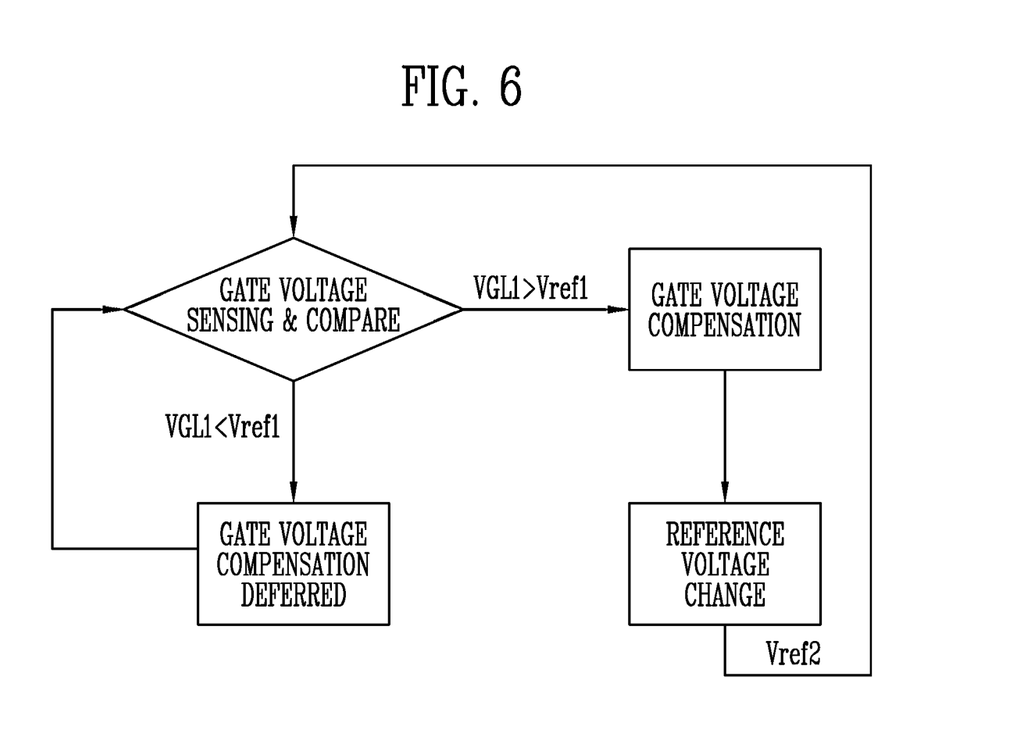
FIG. 6 is a flowchart illustrating a method of driving a voltage compensator according to an embodiment.

FIG. 5 is a schematic block diagram illustrating a configuration of a voltage compensator according to an embodiment, and FIG. 6 is a flowchart illustrating a method of driving a voltage compensator according to an embodiment. Hereinafter, the disclosure is described with reference to FIGS. 1 to 4 together.

Referring to FIGS. 5 and 6, the voltage compensator 160 according to an embodiment may include a gate voltage sensing unit (or gate voltage sensing part) 161, a gate voltage compensator 162, and a reference voltage change unit (or reference voltage change part) 163.

The gate voltage sensing part 161 may sense the gate voltage applied to the gate integrated circuit GDIC. The gate voltage applied to the gate integrated circuit GDIC may be referred to as the first low-level voltage VGL1.

The gate voltage sensing part 161 may compare the first low-level voltage VGL1 with a first reference voltage Vref1. For example, in case that the first low-level voltage VGL1 is greater than the first reference voltage Vref1, the gate voltage compensator 162 may provide the second low-level voltage VGL2 to the scan driver 120. In case that the first low-level voltage VGL1 is less than the first reference voltage Vref1, gate voltage compensation may not be necessary. For example, the gate voltage compensation may be deferred, and the scan driver 120 may generate the scan signal SCAN based on the applied first low-level voltage VGL1.

The gate voltage compensator 162 may compensate the first low-level voltage VGL1 with the second low-level voltage VGL2. For example, the gate voltage compensator 162 may compensate the first low-level voltage VGL1 with a voltage lower than the sensed first low-level voltage VGL1.

The gate voltage compensator 162 may provide the compensated second low-level voltage VGL2 to the scan driver 120 (or the gate integrated circuit GDIC).

The reference voltage change part 163 may change the first reference voltage Vref1 to a second reference voltage Vref2 after the first low-level voltage VGL1 is compensated with the second low-level voltage VGL2.

The reference voltage change part 163 may provide the second reference voltage Vref2 to the gate voltage sensing part 161. The gate voltage sensing part 161 may calculate a new compensation gate voltage by comparing on the second reference voltage Vref2 with a newly sensed gate voltage.

Hereinafter, the configuration of the voltage compensator is described in detail from a circuit point of view with reference to FIG. 7.

Figure 7:
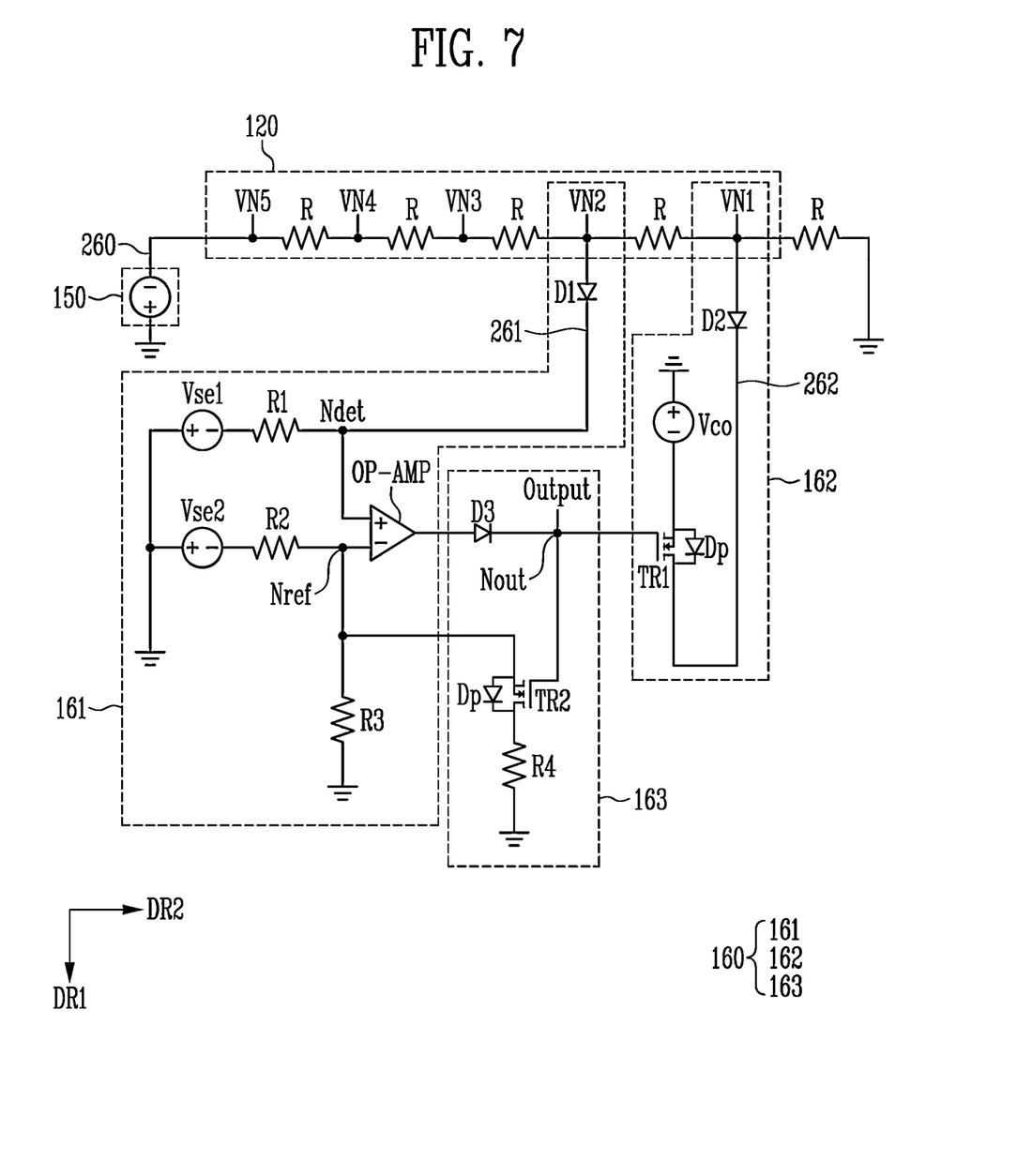
FIG. 7 is a schematic diagram of equivalent circuit illustrating an electrical connection of a voltage compensator according to an embodiment.

FIG. 7 is a schematic diagram of an equivalent circuit illustrating an electrical connection of a voltage compensator according to an embodiment.

Referring to FIG. 7, the voltage compensator 160 may be electrically connected to a first voltage node VN1 and a second voltage node VN2 of the scan driver 120. The first voltage node VN1 and the second voltage node VN2 may be voltage nodes positioned on both sides with the gate integrated circuit GDIC positioned at the upper end portion of the display panel 110 (see FIG. 1) disposed (or interposed) therebetween. The upper end portion of the display panel 110 refers to a portion positioned at the upper side in the second direction DR2 of the display panel 110 described with reference to FIG. 1.

The gate integrated circuit GDIC is denoted by a resistor R for a brief description, a circuit part configuring the gate integrated circuit GDIC may be variously changed.

The second voltage node VN2 may be electrically connected to the feedback line 261, and the second voltage node VN2 may be electrically connected to the second gate power line 262.

The voltage compensator 160 may include at least one resistor, at least one diode, at least one comparator, and at least one strengthening transistor.

The gate voltage sensing part 161 may include a first diode D1, at least one resistors R1, R2, and R3, at least one sensing voltage sources Vse1 and Vse2, and a comparator OP-AMP.

The first diode D1 may be electrically connected between the second voltage node VN2 and a sensing node Ndet.

A positive terminal (+) of the comparator OP-AMP may be electrically connected to the sensing node Ndet, and a negative terminal (−) of the comparator OP-AMP may be electrically connected to a reference node Nref. An output terminal of the comparator OP-AMP may be electrically connected to an output node Nout through a third diode D3. Accordingly, the comparator OP-AMP may supply an output voltage corresponding to a difference between a voltage of the sensing node Ndet and a voltage of the reference node Nref to the output node Nout.

The first sensing voltage source Vse1 may be electrically connected to the sensing node Ndet with the resistor R1 interposed therebetween. The first sensing voltage source Vse1 may supply a voltage of an appropriate level at which a sensing current may flow from the second voltage node VN2 to the sensing node Ndet.

The second sensing voltage source Vse2 may be electrically connected to the reference node Nref with the resistor R2 interposed therebetween. The second sensing voltage source Vse2 may supply a voltage of an appropriate level so that the sensing node Ndet and the reference node Nref may maintain an appropriate voltage difference.

The reference node Nref may be electrically connected to ground power with the resistor R3 interposed therebetween.

Accordingly, the gate voltage sensing part 161 may detect a voltage of the second voltage node VN2 through the sensing node Ndet, compare the sensed voltage with a reference voltage of the reference node Nref, and provide a voltage corresponding to a difference between the sensing voltage and the reference voltage to the output node Nout or Output. In this case, the voltage sensed from the second voltage node VN2 may be referred to as a first gate voltage, and the reference voltage of the reference node Nref may be referred to as a first reference voltage.

The gate voltage compensator 162 may include a second diode D2, a compensation voltage source Vco, and a first strengthening transistor TR1.

The second diode D2 may be electrically connected between the first voltage node VN1 and a second terminal of the first strengthening transistor TR1.

The compensation voltage source Vco may be electrically connected to a first terminal of the first strengthening transistor TR1.

A gate electrode of the first strengthening transistor TR1 may be electrically connected to the output node Nout, the first terminal may be electrically connected to the compensation voltage source Vco, and the second terminal may be electrically connected to a cathode of the second diode D2. A parasitic diode Dp electrically connected between the first terminal and the second terminal of the first strengthening transistor TR1 may be a parasitic diode and may protect a load circuit.

The gate voltage compensator 162 may receive the sensing voltage from the output node Nout, change a gate voltage sensed through the first strengthening transistor TR1, and supply the changed gate voltage to the first voltage node VN1. In this case, the gate voltage supplied to the first voltage node VN1 may be referred to as a second gate voltage.

The reference voltage change part 163 may include a third diode D3, a second strengthening transistor TR2, and at least one resistor R4.

The third diode D3 may be electrically connected between the output terminal of the comparator OP-AMP and the output node Nout.

A gate electrode of the second strengthening transistor TR2 may be electrically connected to the output node Nout, a first terminal thereof may be electrically connected to the reference node Nref, and a second terminal thereof may be electrically connected to the ground power through the resistor R4. The parasitic diode Dp electrically connected to the first terminal and the second terminal of the second strengthening transistor TR2 may protect the load circuit.

The reference voltage change part 163 may change the voltage of the reference node Nref from the first reference voltage to the second reference voltage after gate voltage compensation is performed. The second reference voltage may be changed in response to the voltage of the second voltage node VN2.

The resistors R, R1, R2, R3, and R4 shown in FIG. 7 may have the same value, or at least some thereof may have the same value, and the remaining resistor may have different values. The first strengthening transistor TR1 and the second strengthening transistor TR2 shown in FIG. 7 are NMOS transistors, but the disclosure is not limited thereto, and may be implemented as PMOS transistors.

Hereinafter, in a display device according to a comparative example and a display device according to an embodiment, it can be seen how a gate voltage is compensated by measuring a voltage at each node of the scan driver 120 and/or the voltage compensator 160.

The display device according to the comparative example does not include the voltage compensator 160. Accordingly, in case that the voltages are measured at each node included in the scan driver 120, the voltages may be as shown in Table 1 below. Here, the voltage of each of nodes VN1, VN2, VN3, VN4, and VN5 may be measured based on the low level voltage among the gate voltages.

TABLE 1

| Each node | Measured value |
| --- | --- |
| VN1 | −2.1744785e+000 |
| VN2 | −2.3919261e+000 |

TABLE 1-continued

| Each node | Measured value |
| --- | --- |
| VN3 | −2.6092656e+000 |
| VN4 | −4.7826605e+000 |
| VN5 | −5.0000000e+000 |

In the display device according to the comparative example, looking at the voltages of each node from a node closer to the voltage supply 150 to a node farther away from the voltage supply 150, it can be seen that an absolute value of the measured value decreases from the fifth voltage node VN5 to the first voltage node VN1. For example, since the voltage drop may increase by the gate power line 260 from the fifth voltage node VN5 to the first voltage node VN1, a distorted scan signal may be applied to a scan line electrically connected to the first voltage node VN1. Accordingly, the gate block in which an image is not properly displayed in the upper end portion of the display panel may occur, and may affect the image quality of the display device.

On the other hand, the display device according to an embodiment includes the voltage compensator 160 capable of compensating the gate voltage. Accordingly, in case that the voltages are measured at each node included in the scan driver 120 and the voltage compensator 160, the voltages may be as shown in Table 2 below. The voltages of each of nodes VN1, VN2, VN3, VN4, and VN5 are measured based on the low-level voltage among the gate voltages.

TABLE 2

| Each node | Measured value |
| --- | --- |
| VN1 | −4.9999990e+000 |
| VN2 | −4.9999995e+000 |
| VN3 | −4.9999913e+000 |
| VN4 | −4.9999992e+000 |
| VN5 | −5.0000000e+000 |

In the display device according to an embodiment, looking at the voltages of each node from a node closer to the voltage supply 150 to a node farther away from the voltage supply 150, it can be seen that an absolute value of the measured values is maintained almost to be constant from the fifth voltage node VN5 to the first voltage node VN1. For example, the voltage drop may increase by the gate power line 260 from the fifth voltage node VN5 to the first voltage node VN1, but the voltages of each node may be compensated through the voltage compensator 160, and thus the voltage at each node may be maintained almost to be constant.

Accordingly, the image quality of the display device according to an embodiment may be improved.

Hereinafter, improvements in the image quality of a display device according to an embodiment are described with reference to FIG. 8.

Figure 8:
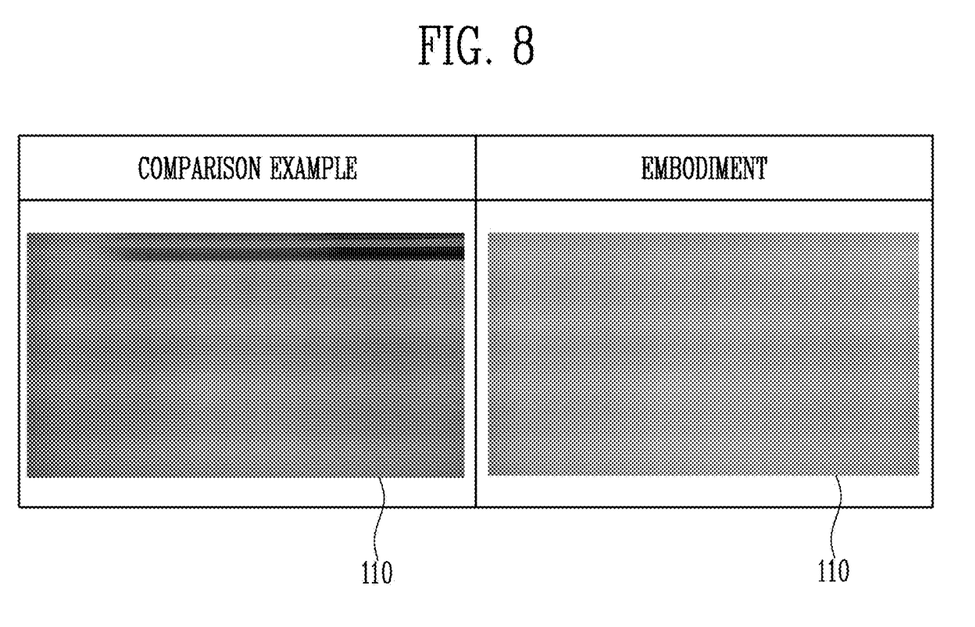
FIG. 8 is images showing a display device according to a comparative example and a display panel of a display device according to an embodiment.

FIG. 8 is images illustrating a display device according to a comparative example and a display panel of a display device according to an embodiment.

Looking at the display device according to the comparative example, it can be seen that a gate block displayed in block occurs in an upper end portion of the display panel 110. For example, in the display device according to the comparative example, the voltage drop may occur due to the gate power line toward the upper end portion of the display panel 110, and thus the gate block may occur in the display panel 110.

On the other hand, looking at the display device according to an embodiment, it can be seen that an image may be uniformly displayed on the entire display panel 110 without a portion thereof stained in black. For example, since the display device according to an embodiment may compensate the gate voltage supplied to the scan driver by adding the voltage compensator electrically connected to the scan driver, image quality of the display device may not be deteriorated.

Hereinafter, a pixel and a light emitting element included in a display device according to an embodiment are described with reference to FIGS. 9 and 10.

Figure 9:
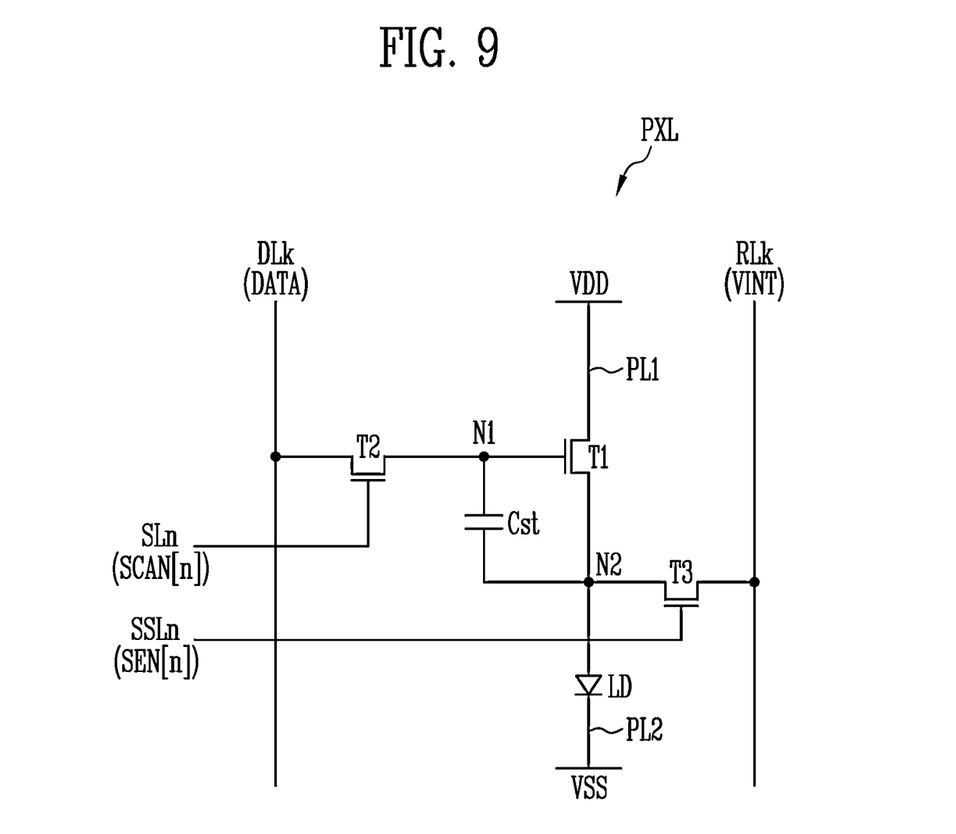
FIG. 9 is a schematic diagram of equivalent circuit illustrating an example of a pixel included in the display device of FIG. 1.

FIG. 9 is a schematic diagram of an equivalent circuit illustrating an example of the pixel included in the display device of FIG. 1. FIG. 9 illustrates, as an example, a pixel PXL included in an n-th pixel row and a k-th pixel column (where n and k are positive integers).

Referring to FIG. 9, the pixel PXL includes a light emitting element LD, a first transistor T1 (or a driving transistor), a second transistor T2 (or a switching transistor), a third transistor T3 (or a sensing transistor), and a storage capacitor Cst.

The light emitting element LD may generate light of a predetermined luminance in response to a current amount supplied from the first transistor T1. The light emitting element LD includes a first electrode and a second electrode, the first electrode is electrically connected to a second node N2, and the second electrode is electrically connected to a second power line PL2 to which the second driving voltage VSS is applied. In an embodiment, the first electrode may be an anode, and the second electrode may be a cathode. According to an embodiment, the first electrode may be a cathode, and the second electrode may be an anode.

In an embodiment, the light emitting element LD may be an inorganic light emitting element formed of an inorganic material. According to an embodiment, the light emitting element LD may be an organic light emitting diode including an organic light emitting layer. The light emitting element LD may be a light emitting element configured of an inorganic material and an organic material in combination.

A first electrode of the first transistor T1 may be electrically connected to a first power line PL1 to which the first driving voltage VDD is applied, and a second electrode of the first transistor T1 may be electrically connected to a first electrode of the light emitting element LD (or the second node N2). A gate electrode of the first transistor T1 may be electrically connected to a first node N1. In an embodiment, the first electrode may be a drain electrode, and the second electrode may be a source electrode.

The first transistor T1 may control a current amount flowing to the light emitting element LD in response to a voltage of the first node N1. In this case, the first transistor T1 may be turned on in case that a voltage between the first node N1 and the second node N2 (for example, a gate-source voltage) is greater than a threshold voltage.

A first electrode of the second transistor T2 may be electrically connected to a k-th data line DLk, and a second electrode of the second transistor T2 may be electrically connected to the first node N1 (or the gate electrode of the first transistor T1). A gate electrode of the second transistor T2 may be electrically connected to an n-th scan line SLn. The second transistor T2 may be turned on in case that a scan signal SCAN[n] (for example, a high-level voltage) is supplied to an n-th scan line SLn, to transmit a data voltage DATA from the k-th data line DLk to the first node N1.

A first electrode of the third transistor T3 may be electrically connected to a k-th sensing line RLk, and a second electrode may be electrically connected to the second node N2 (or the second electrode of the first transistor T1). A gate electrode of the third transistor T3 may be electrically connected to an n-th sensing control line SSLn. The third transistor T3 may be turned on in case that a sensing control signal SEN[n] (for example, a high-level voltage) is supplied to the n-th sensing control line SSLn, to electrically connect the k-th sensing line RLk and the second node N2. Accordingly, the initialization voltage VINT may be provided to the second node N2 during a predetermined time. However, the disclosure is not limited thereto, and a sensing current (or a sensing voltage) corresponding to a node voltage of the second node N2 may be transmitted to the k-th sensing line RLk. The sensing voltage may be provided to the data driver 130 (see FIG. 1) through the k-th sensing line RLk.

The storage capacitor Cst is electrically connected between the first node N1 and the second node N2. The storage capacitor Cst may be charged with the data voltage DATA corresponding to a data signal supplied to the first node N1 during a frame. Accordingly, the storage capacitor Cst may store a voltage corresponding to a voltage difference between the first node N1 and the second node N2. In case that the data voltage DATA is supplied, the initialization voltage VINT may be supplied to the second node N2, and thus the storage capacitor Cst may store a voltage corresponding to a difference between the data voltage DATA and the initialization voltage VINT. Whether the first transistor T1 is turned on or turned off may be determined according to the voltage stored in the storage capacitor Cst.

The circuit structure of the pixel PXL is not limited to that in FIG. 9. For example, the light emitting element LD may be positioned between the first power line PL1 electrically connected to the first driving voltage VDD and the first electrode of the first transistor T1.

FIG. 9 illustrates that the transistor is an NMOS transistor, but the disclosure is not limited thereto. For example, at least one of the first to third transistors T1, T2, and T3 may be implemented as a PMOS transistor. The first to third transistors T1, T2, and T3 shown in FIG. 9 may be thin-film transistors including at least one of an oxide semiconductor, an amorphous silicon semiconductor, and a polycrystalline silicon semiconductor.

Figure 10:
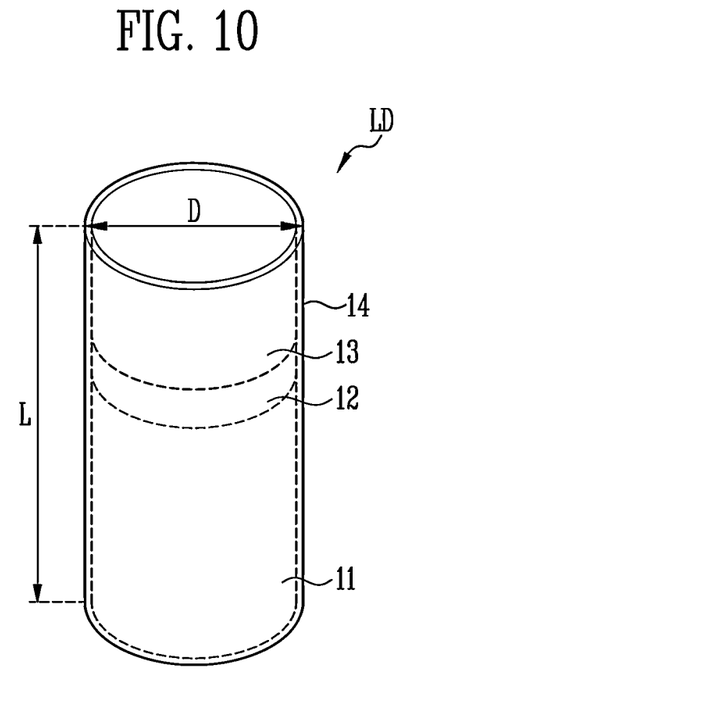
FIG. 10 is a perspective view schematically illustrating a light emitting element included in one pixel of a display device according to an embodiment.

FIG. 10 is a schematic perspective view illustrating a light emitting element included in a pixel of a display device according to an embodiment.

Referring to FIG. 10, the light emitting element LD according to an embodiment includes a first semiconductor layer 11, an active layer 12, and a second semiconductor layer 13.

For example, the light emitting element LD may be configured as a stack in which the first semiconductor layer 11, the active layer 12, and the second semiconductor layer 13 are sequentially stacked in a length direction (L).

The first semiconductor layer 11 may include at least one n-type semiconductor layer. For example, the first semiconductor layer 11 may include a semiconductor material among InAlGaN, GaN, AlGaN, InGaN, AlN, and InN and may include an n-type semiconductor layer doped with a first conductive dopant such as Si, Ge, or Sn. However, the material configuring the first semiconductor layer 11 is not limited thereto, and various other materials may configure the first semiconductor layer 11.

The active layer 12 may be disposed on the first semiconductor layer 11 and may be formed in a single or multiple quantum well structure. In an embodiment, a clad layer doped with a conductive dopant may be formed on and/or under the active layer 12. For example, the clad layer may be formed of (or include) an AlGaN layer or an InAlGaN layer. According to an embodiment, a material such as AlGaN or InAlGaN may be used to form the active layer 12, and various other materials may configure the active layer 12. In case that a voltage equal to or greater than a threshold voltage is applied to both ends of the light emitting element LD, the light emitting element LD emits light while electron-hole pairs are combined in the active layer 12. By controlling light emission of the light emitting element LD using such a principle, the light emitting element LD may be used as a light source of various light emitting devices including the pixel PXL of the display device.

The second semiconductor layer 13 may be disposed on the active layer 12 and may include a semiconductor layer of a type different from that of the first semiconductor layer 11. For example, the second semiconductor layer 13 may include at least one p-type semiconductor layer. For example, the second semiconductor layer 13 may include at least one semiconductor material among InAlGaN, GaN, AlGaN, InGaN, AlN, and InN and may include a p-type semiconductor layer doped with a second conductive dopant such as Mg, Zn, Ca, Sr, or Ba. However, the material configuring the second semiconductor layer 13 is not limited thereto, and various other materials may configure the second semiconductor layer 13.

In the above-described embodiment, each of the first semiconductor layer 11 and the second semiconductor layer 13 is configured of one layer, but the disclosure is not limited thereto. In an embodiment, according to the material of the active layer 12, each of the first semiconductor layer 11 and the second semiconductor layer 13 may further include at least one layers, for example, a clad layer and/or a tensile strain barrier reducing (TSBR) layer. The TSBR layer may be a strain alleviating layer disposed between semiconductor layers of which lattice structures are different to serve as a buffer for reducing a difference in lattice constants. The TSBR layer may be configured of a p-type semiconductor layer such as a p-GaInP, p-AlInP, or p-AlGaInP layer, but the disclosure is not limited thereto.

In case that an extension direction of the light emitting element LD is referred to as the length direction (L), the light emitting element LD may have one end portion (or first end portion) and another end portion (or second end portion) in the length direction (L). According to an embodiment, one of the first semiconductor layer 11 and the second semiconductor layer 13 may be disposed at one end portion of the light emitting element LD, and the other of the first semiconductor layer 11 the second semiconductor layer 13 may be disposed at the another end portion of the light emitting element LD.

According to an embodiment, the light emitting element LD may have a small size to a degree of the nanoscale to the microscale. Each light emitting element LD may have a diameter D and/or a length L of the nanoscale to the microscale.

According to an embodiment, the light emitting element LD may be a rod-shaped light emitting diode manufactured in a rod shape. In the specification, the term "rod-shaped" refers to a rod-like shape or a bar-like shape that is long (for example, having an aspect ratio greater than 1) in the length direction (L), such as a circular column or a polygonal column, and a shape of a cross section thereof is not particularly limited. For example, the length L of the light emitting element LD may be greater than the diameter D (or a width of the cross section) thereof.

FIG. 10 illustrates the light emitting element having a columnar shape, but the type and/or shape of the light emitting element is not limited to that shown in the drawing.

In an embodiment, the light emitting element LD further includes an insulating layer 14 provided on a surface. The insulating layer 14 may be formed on the surface of the light emitting element LD to surround an outer circumferential surface of the active layer 12, and may further surround one region of the first semiconductor layer 11 and the second semiconductor layer 13. Referring to FIG. 10, in an embodiment, the insulating layer 14 may not cover and may expose one end of each of the first semiconductor layer 11 and the second semiconductor layer 13 positioned at both ends of the light emitting element LD in the length direction (L) (for example, two bottom surfaces of a cylinder (an upper surface and a lower surface of the light emitting element LD)).

In case that the insulating layer 14 is provided on a surface of the light emitting element LD, in particular, a surface of the active layer 12, the active layer 12 may be prevented from being shorted with at least one electrode or the like (for example, at least one of contact electrodes electrically connected to the both ends of the light emitting element LD). Accordingly, electrical stability of the light emitting element LD may be secured.

In an embodiment, the light emitting element LD may further include an additional component in addition to the first semiconductor layer 11, the active layer 12, the second semiconductor layer 13, and the insulating layer 14. For example, the light emitting element LD may additionally include one or more phosphor layers, active layers, semiconductor layers, and/or electrodes disposed on one end side of the first semiconductor layer 11, the active layer 12, and the second semiconductor layer 13.

Although the disclosure has been described with reference to the embodiment above, those skilled in the art or those having a common knowledge in the art will understand that the disclosure may be various modified and changed without departing from the spirit and technical area of the disclosure.

The technical scope of the claimed invention should not be limited to the contents described in the detailed description of the specification, but should be defined by the claims.

What is claimed is:
1. A display device comprising:
pixels electrically connected to a plurality of scan lines and a plurality of data lines, respectively;
a scan driver that provides a scan signal to each of the plurality of scan lines;
a voltage supply that supplies a first gate voltage to the scan driver through a first gate power line; and
a voltage compensator, wherein
the voltage compensator senses a partial voltage of the first gate voltage applied to the scan driver through a feedback line,
the voltage compensator compensates the first gate voltage with a second gate voltage in case that the sensed first gate voltage is greater than a first reference voltage, and
in response to the compensating the first gate voltage with the second gate voltage, the voltage compensator changes the first reference voltage.
2. The display device according to claim 1, wherein
each of the plurality of scan lines extends in parallel in a first direction, each of the plurality of data lines extends in parallel in a second direction perpendicular to the first direction, and the voltage compensator senses the partial voltage of the first gate voltage applied to the scan driver disposed at an upper side in the second direction.

3. The display device according to claim 2, wherein
the scan driver includes a plurality of gate integrated circuits disposed to be spaced apart from each other in the second direction, and
the voltage compensator senses the first gate voltage applied to one of the plurality of gate integrated circuits disposed at the upper side in the second direction.

4. The display device according to claim 3, wherein the voltage supply provides a high-level voltage and a first low-level voltage to the first gate power line.

5. The display device according to claim 4, wherein
the voltage compensator senses the first low-level voltage applied to the one of the plurality of gate integrated circuits, and
the voltage compensator compensates the first low-level voltage with a second low-level voltage in case that the sensed first low-level voltage is greater than the first reference voltage.

6. The display device according to claim 5, wherein the voltage compensator changes the second low-level voltage to be lower than the first low-level voltage.

7. The display device according to claim 6, wherein the voltage compensator provides the second low-level voltage to the one of the plurality of gate integrated circuits.

8. The display device according to claim 1, wherein the voltage compensator transmits the second gate voltage to the scan driver through a second gate power line electrically connected to the scan driver.

9. The display device according to claim 1, wherein the scan driver provides a scan signal generated based on the second gate voltage to at least one scan line.

10. A display device comprising:
a display panel;
a scan driver including at least one gate integrated circuit electrically connected to the display panel;
a voltage supply that outputs a first gate voltage to each of the at least one gate integrated circuit; and
a voltage compensator that senses the first gate voltage applied to one of the at least one gate integrated circuit and compensate the first gate voltage with a second gate voltage, wherein
the voltage compensator transmits the first gate voltage to the scan driver through a first gate power line, and
the voltage compensator transmits the second gate voltage to the scan driver through a second gate power line different from the first gate power line and electrically connected to the first gate power line.

11. The display device according to claim 10, wherein the voltage compensator is electrically connected to a first voltage node and a second voltage node disposed at both sides with one of the at least one gate integrated circuit which is disposed at an upper portion of the display panel.

12. The display device according to claim 11, wherein the voltage compensator comprises:
a first diode electrically connected between the second voltage node and a sensing node;

a comparator including:
a positive terminal electrically connected to the sensing node;
a negative terminal electrically connected to a reference node; and
an output terminal electrically connected to an output node;
a first sensing voltage source electrically connected between ground power and the sensing node with at least one resistor interposed therebetween; and
a second sensing voltage source electrically connected between the ground power and the reference node with at least one resistor interposed therebetween.

13. The display device according to claim 12, wherein the voltage compensator further comprises:
a second diode electrically connected to the first voltage node; and
a first strengthening transistor including:
a gate electrode electrically connected to the output node;
a first terminal electrically connected to a compensation voltage source; and
a second terminal electrically connected to a cathode of the second diode.

14. The display device according to claim 13, wherein the voltage compensator further comprises:
a third diode electrically connected between the output terminal of the comparator and the output node; and
a second strengthening transistor including:
a gate electrode electrically connected to the output node;
a first terminal electrically connected to the reference node; and
a second terminal electrically connected to the ground power through at least one resistor.

15. A display device comprising:
a display panel;
a scan driver including a plurality of gate integrated circuits electrically connected to the display panel;
a voltage supply that outputs a first gate voltage to each of the plurality of gate integrated circuits; and
a voltage compensator, wherein
the voltage compensator senses a partial voltage of the first gate voltage applied to at least one of the plurality of gate integrated circuits,
the voltage compensator compares the sensed first gate voltage with a first reference voltage,
the voltage compensator compensates the sensed first gate voltage with a second gate voltage in case that the sensed first gate voltage is greater than the first reference voltage, and
the voltage compensator changes the first reference voltage to a second reference voltage after compensating the second gate voltage.

16. The display device according to claim 15, wherein
the first gate voltage is a first low-level voltage, and
the second gate voltage is a second low-level voltage.

17. The display device according to claim 16, wherein the voltage compensator changes the second low-level voltage to be lower than the first low-level voltage.

18. The display device according to claim 15, wherein
the plurality of gate integrated circuits are disposed in parallel in a second direction, and
the voltage compensator senses the first gate voltage applied to one of the plurality of gate integrated circuits disposed at an upper side in_the second direction.

* * * * *